(12) United States Patent
Kwon

(10) Patent No.: US 9,369,858 B2
(45) Date of Patent: Jun. 14, 2016

(54) WI-FI P2P COMMUNICATION TERMINAL DEVICE AND COMMUNICATION METHOD THEREOF

(71) Applicant: SAMSUNG ELECTRONICS CO., LTD., Suwon-si (KR)

(72) Inventor: Jae-un Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 14/026,035

(22) Filed: Sep. 13, 2013

(65) Prior Publication Data

US 2014/0112324 A1    Apr. 24, 2014

(30) Foreign Application Priority Data

Oct. 22, 2012   (KR) .................. 10-2012-0117532

(51) Int. Cl.
    *H04W 4/00*    (2009.01)
    *H04W 8/00*    (2009.01)
    *H04W 84/18*   (2009.01)
    *H04W 88/06*   (2009.01)
(52) U.S. Cl.
    CPC .............. *H04W 8/005* (2013.01); *H04W 84/18* (2013.01); *H04W 88/06* (2013.01)
(58) Field of Classification Search
    CPC ................................................. H04W 76/023
    USPC ........................................................ 370/338
    See application file for complete search history.

(56) References Cited

U.S. PATENT DOCUMENTS

| 8,892,722 | B1* | 11/2014 | Kopikare | ............. G06F 15/173 370/329 |
| 2008/0119192 | A1* | 5/2008 | Miyata | ................. H04W 36/30 455/438 |
| 2011/0161697 | A1* | 6/2011 | Qi | ........................ G06F 1/3209 713/320 |
| 2012/0134349 | A1 | 5/2012 | Jung et al. | |
| 2012/0155350 | A1* | 6/2012 | Wentink et al. | ................ 370/311 |
| 2012/0258715 | A1* | 10/2012 | Souissi et al. | ................. 455/436 |

(Continued)

FOREIGN PATENT DOCUMENTS

EP    2 605 552 A2    6/2013

OTHER PUBLICATIONS

Communication dated May 21, 2014 issued by the European Patent Office in counterpart European Patent Application No. 13185594.2.

(Continued)

*Primary Examiner* — Wei Zhao
*Assistant Examiner* — Abdeltif Ajid
(74) *Attorney, Agent, or Firm* — Sughrue Mion, PLLC

(57) ABSTRACT

A display apparatus which is controlled by a remote control apparatus is provided. The display apparatus includes a wireless fidelity (Wi-Fi) module which is connected to an access point (AP) and operates in a Wi-Fi station mode and a controller which controls the Wi-Fi module to interrupt the connection to the AP when a Wi-Fi peer-to-peer (P2P) function is executed and iterates an operation of resuming the connection to the AP after a search operation is performed through each channel while a plurality of channels are sequentially selected. when an external device which performs P2P communication is found in the search operation, the controller controls the Wi-Fi module to perform a listen operation of receiving a signal transmitted from the external device and transmitting a response.

16 Claims, 9 Drawing Sheets

(56) References Cited

U.S. PATENT DOCUMENTS

2013/0065648 A1* 3/2013 Kim .................. G06F 21/31
455/566
2013/0148545 A1* 6/2013 Jung .................. H04W 48/16
370/255

OTHER PUBLICATIONS

"Wi-Fi Peer-to-Peer (P2P) Technical Specification", Wi-Fi Alliance Technical Committee P2P Task Group, Wi-Fi Alliance, Version 1.2, Dec. 14, 2011, 159 pgs. total, XP008165048.

* cited by examiner

FIG. 2
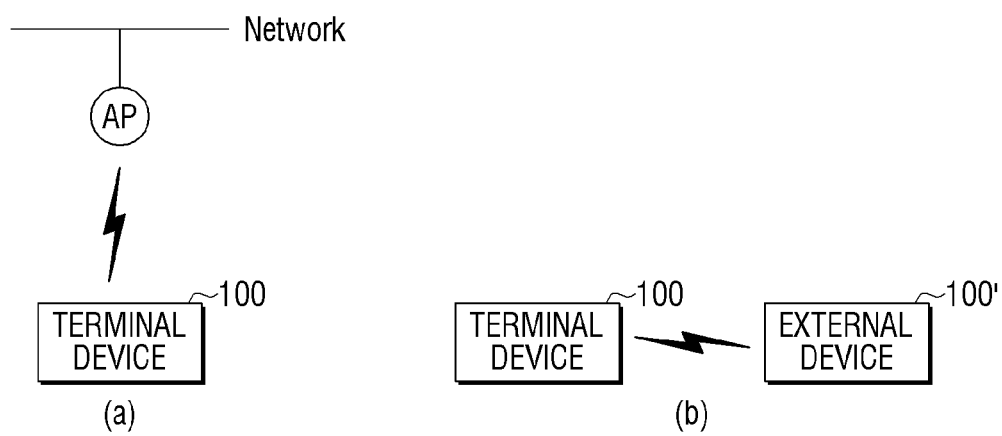
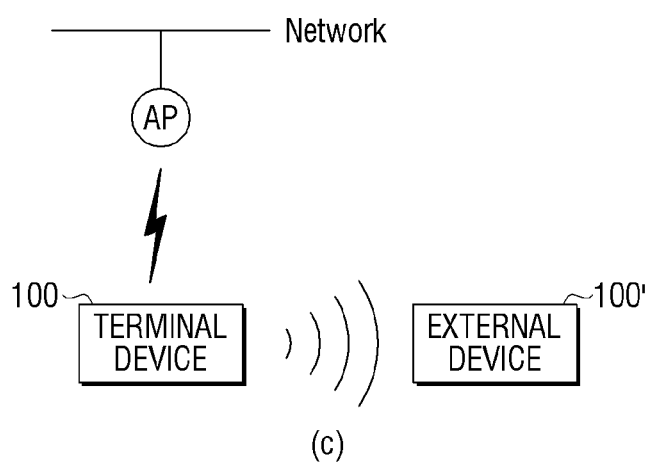

WI-FI P2P COMMUNICATION TERMINAL DEVICE AND COMMUNICATION METHOD THEREOF

CROSS-REFERENCE TO RELATED APPLICATIONS

This application claims priority from Korean Patent Application No. 10-2012-0117532, filed on Oct. 22, 2012, in the Korean Intellectual Property Office, the disclosure of which is incorporated herein by reference, in its entirety.

BACKGROUND

1. Field

The inventive concept relates to a wireless fidelity (Wi-Fi) peer-to-peer (P2P) communication terminal device and a Wi-Fi P2P communication method thereof. More particularly, the inventive concept relates to a terminal device capable of Wi-Fi P2P communication during a Wi-Fi station mode, and a communication method thereof.

2. Description of the Related Art

In general, Wi-Fi serving as wireless communication technology is widely used throughout the world under the 802.11 standard of the Institute Electrical and Electronics Engineers (IEEE) is being used in various devices such as notebooks, portable phones, console game machines, smart televisions (TVs), MPEG Audio Layer-3 (MP3) players, cameras, and printers. Wi-Fi communication is performed using an access point (AP) as the center. Thus, the Wi-Fi communication in various devices can be performed only when a connection to an AP serving as a network AP is established.

On the other hand, the, Wi-Fi Alliance (WFA) has recently published a new standard referred to as Wi-Fi Direct® to deliver data through a direct connection between wireless devices. The Wi-Fi Direct technology is implemented in portable devices such as TVs, notebooks, printers, and cameras, and mobile terminals. The Wi-Fi Direct® technology provides a base for enabling content and services between devices to be used through direct communication between the devices without the use of separate equipment such as an AP or router. Accordingly, in the related industry, technical development activities for satisfying a Wi-Fi Direct® standard are actively ongoing.

In a strict sense, Wi-Fi Direct® is a brand name and is thus a trademark. Technical standards for Wi-Fi Direct® are collectively referred to as Wi-Fi P2P. Thus, communication technology through a direct connection between Wi-Fi terminal devices used herein is referred to as Wi-Fi P2P.

Wi-Fi P2P is technology for a direct connection between Wi-Fi terminal devices. In the Wi-Fi P2P technology, supporting direct communication between the Wi-Fi terminal devices is added in a state in which many functions of the existing Wi-Fi standard are maintained. In the Wi-Fi P2P technology, P2P communication between the Wi-Fi terminal devices can be provided merely by upgrading a software function of a device mounted on an existing Wi-Fi chip. Accordingly, the Wi-Fi terminal device, which is operating in a station mode by establishing a connection to a network through an AP, can perform Wi-Fi P2P communication simultaneously with the station mode operation, and a Wi-Fi P2P standard supports the above-described operation.

On the other hand, for Wi-Fi P2P communication to be performed by the Wi-Fi terminal device simultaneously with an operation in the Wi-Fi station mode, it is necessary to perform a process of interrupting a connection to an AP and searching for whether there is an external device capable of Wi-Fi P2P communication in the periphery. Accordingly, when the Wi-Fi P2P communication is intended while an operation is performed in the Wi-Fi station mode, the performance of the operation in the Wi-Fi station mode may be degraded.

Thus, there is a need for technology capable of minimizing the degradation of performance of a Wi-Fi station mode operation when a Wi-Fi terminal device, which is operating in a Wi-Fi station mode, waits for a Wi-Fi P2P connection so as to establish the Wi-Fi P2P connection with an external device.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

Aspects of the exemplary embodiments relate to providing a wireless fidelity (Wi-Fi) terminal device and a Wi-Fi P2P method communication thereof which minimizes the degradation of performance of a Wi-Fi station mode operation when a Wi-Fi terminal device, which is operating in a Wi-Fi station mode, waits for a Wi-Fi P2P connection so as to establish the Wi-Fi P2P connection with an external device, and waits for a Wi-Fi P2P connection to an external device.

According to one exemplary embodiment, a terminal device includes a wireless fidelity (Wi-Fi) module which is connected to an access point (AP) and operates in a Wi-Fi station mode, and a controller which controls the Wi-Fi module to interrupt the connection to the AP when a Wi-Fi peer-to-peer (P2P) function is executed and iterates an operation of resuming the connection to the AP after a search operation is performed through each channel while a plurality of channels are sequentially selected. When an external device to perform P2P communication is found in the search operation, the controller controls the Wi-Fi module to perform a listen operation of receiving a signal transmitted from the external device and transmitting a response.

The controller may control the Wi-Fi module to operate in the Wi-Fi station mode and automatically execute the Wi-Fi P2P function when the terminal device is turned on and initialized.

The terminal device may further include an input which receives a user command for executing the Wi-Fi P2P function, the controller causes the Wi-Fi P2P function to be executed when the user command is input.

The controller may determine whether the Wi-Fi station mode is in operation when the Wi-Fi P2P function is executed. The controller may iterate the interruption, the search operation, and the connection resumption operation when the Wi-Fi station mode is in operation, and the controller may iterate a find operation when the Wi-Fi station mode is not in operation.

The controller may control the Wi-Fi module to establish a Wi-Fi P2P connection with the external device when the external device finds the terminal device in the listen operation, and adjust a connection channel for the external device to a connection channel for the AP when the Wi-Fi P2P connection to the external device is established.

A Wi-Fi P2P communication method of a terminal device includes interrupting a connection to an AP when a Wi-Fi P2P function is executed in a state in which the connection to the AP is established and an operation is performed in a Wi-Fi station mode and iterating an operation of resuming the connection to the AP after a search operation is performed through each channel while a plurality of channels are sequentially selected, and performing, when an external device to perform Wi-Fi P2P communication is found in the search operation, a listen operation of receiving a signal transmitted from the external device and transmitting a response.

The Wi-Fi P2P communication method may further include causing the Wi-Fi module to automatically execute the Wi-Fi P2P function when the terminal device is turned on and initialized.

The Wi-Fi P2P communication method may further include receiving an input of a user command for executing the Wi-Fi P2P function, and causing the Wi-Fi P2P function to be executed in response to the user command being input.

The Wi-Fi P2P communication method may further include determining whether the Wi-Fi station mode is in operation when the Wi-Fi P2P function is executed, and iterating a find operation when the Wi-Fi station mode is not in operation.

The Wi-Fi P2P communication method may further include establishing a Wi-Fi P2P connection to the external device when the external device finds the terminal device in the listen operation, and adjusting a connection channel for the external device to a connection channel for the AP when the Wi-Fi P2P connection to the external device is established.

According to various exemplary embodiments, it may be possible to minimize the degradation of performance of a Wi-Fi station mode operation when a Wi-Fi terminal device, which is operating in a Wi-Fi station mode, waits for a Wi-Fi P2P connection so as to establish the Wi-Fi P2P connection with an external device, and wait for a Wi-Fi P2P connection to an external device.

According to another exemplary embodiment, a terminal device may be provided which includes: a wireless fidelity (Wi-Fi) module which is connected to an access point (AP) and operates in a Wi-Fi station mode; and a controller which controls the Wi-Fi module to interrupt the connection to the AP when a Wi-Fi peer-to-peer (P2P) function is executed and controls the Wi-Fi module to perform a listen operation of receiving a signal transmitted from an external device which performs P2P communication, when the terminal device is found by the external device. The controller may control the Wi-Fi module to operate in the Wi-Fi station mode and automatically executes the Wi-Fi P2P function when the terminal device is turned on and initialized. An input may be provided which receives an input user command for executing the Wi-Fi P2P function, wherein the controller causes the Wi-Fi P2P function to be executed when the user command is input.

The controller may control the Wi-Fi module and may iterate an operation of resuming the connection to the AP after a search operation is performed through each channel while a plurality of channels are sequentially selected.

Another exemplary embodiment may provide a Wi-Fi P2P method of communication for a terminal device, the method including: interrupting a connection to an AP when a Wi-Fi P2P function is executed in a Wi-Fi station mode; and performing a listen operation of receiving a signal transmitted from an external device when an external device to perform Wi-Fi P2P communication is found in a search operation. The method of this exemplary embodiment may also include iterating an operation of resuming the connection to the AP after a search operation is performed through each channel while a plurality of channels are sequentially selected.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by reference to the accompanying drawings, in which:

FIG. 2 is a diagram which illustrates examples of topologies in which a terminal device capable of Wi-Fi communication operates in various modes;

Figure 8:
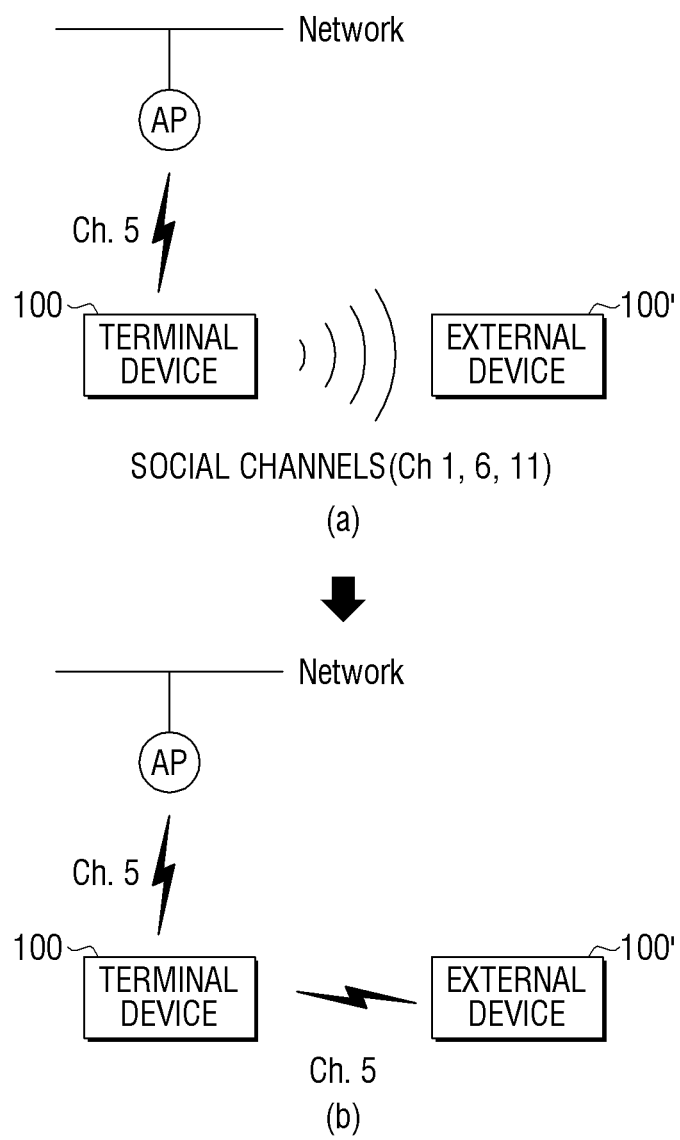
Figure 9:
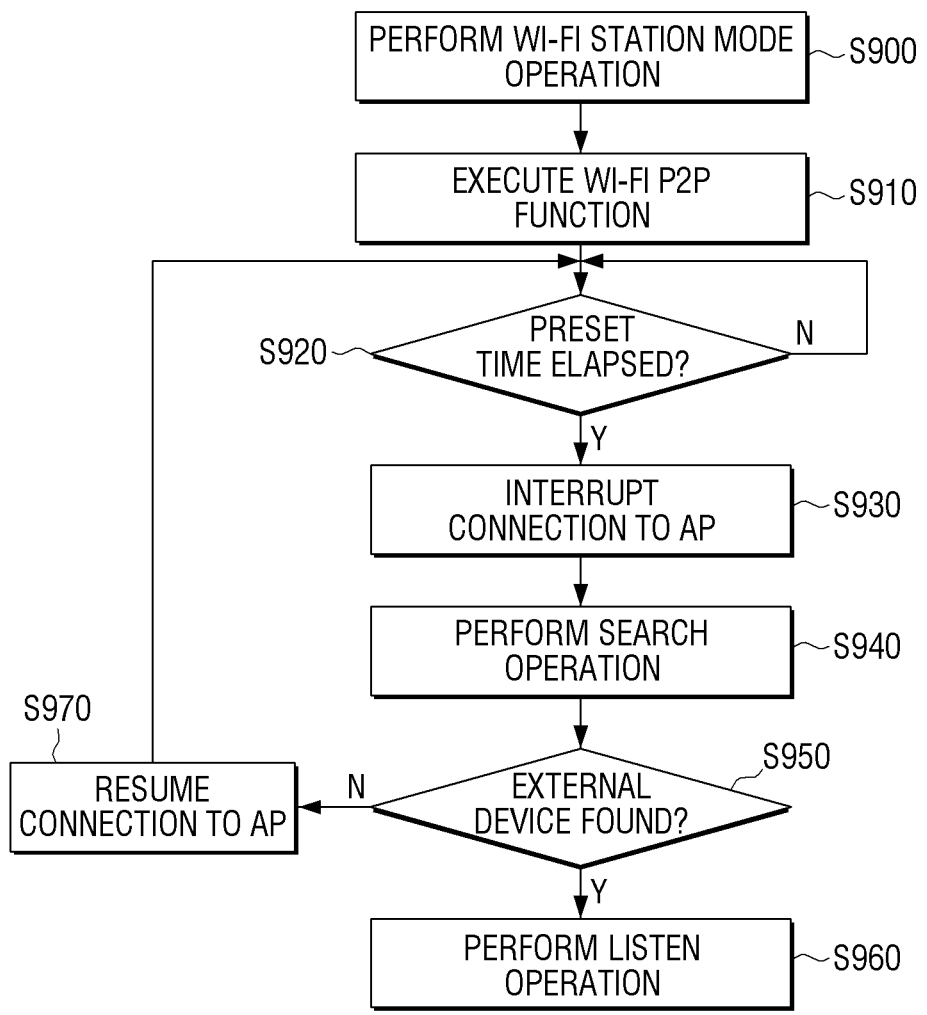

FIG. 8 is a diagram which illustrates a process in which the terminal device adjusts a P2P communication channel to a station mode channel by operating as a group owner (GO) when the terminal device operates in a station mode and a P2P mode simultaneously in accordance with an exemplary embodiment; and FIG. 9 is a flowchart which illustrates a Wi-Fi P2P communication method of the terminal device in accordance with an exemplary embodiment.

DETAILED DESCRIPTION OF THE EXEMPLARY EMBODIMENTS

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the inventive concept. Thus, it is apparent that the exemplary embodiments can be carried out without those specifically defined matters. Also, well-known functions or constructions are not described in detail since they would obscure the exemplary embodiments with unnecessary detail.

Figure 1:
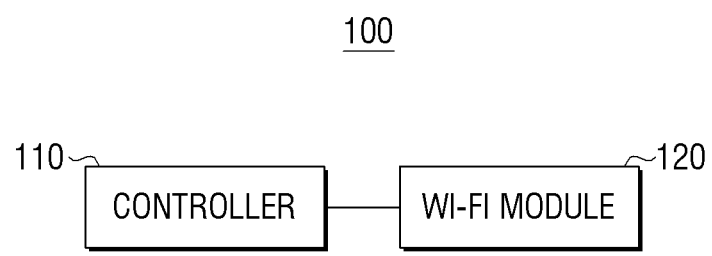
FIG. 1 is a diagram which illustrates a configuration of a terminal device in accordance with an exemplary embodiment.

FIG. 1 is a diagram which illustrates a configuration of a terminal device in accordance with an exemplary embodiment. Referring to FIG. 1, the terminal device 100 includes a controller 110 and a Wi-Fi module 120.

The Wi-Fi module 120 is an element that can communicate with a network by establishing a connection to an AP in a Wi-Fi system (hereinafter referred to as a "Wi-Fi station mode operation") or may communicate with an external device capable of Wi-Fi P2P communication (hereinafter referred to as a "Wi-Fi P2P mode operation"). In addition, although not illustrated, the Wi-Fi module 120 can include an antenna for Wi-Fi wireless communication, a radio frequency (RF) transmitter for up-converting a frequency of a signal to be transmitted and amplifying the up-converted frequency of the signal, an RF receiver which performs low-noise amplification on a received signal and down-converting a frequency of the signal, an RF signal modulator/demodulator, a signal processor, and the like. The controller 110 controls a mode and a processing operation.

The controller 110 performs a function of controlling the overall operation of the terminal device 100. In particular, the controller 110 can control the Wi-Fi module 120 to perform the Wi-Fi station mode operation and the Wi-Fi P2P mode operation.

FIG. 2 is a diagram which illustrates examples of topologies in which a terminal device capable of Wi-Fi communication operates in various modes. FIG. 2(*a*) illustrates a typical example in which the terminal device 100 is connected to an AP and operates in the Wi-Fi station mode, and FIG. 2(*b*) illustrates a typical example in which the terminal device 100 performs Wi-Fi P2P communication with an external device 100' capable of Wi-Fi P2P communication.

FIG. 2(*c*) illustrates a state in which the Wi-Fi P2P communication is initiated while the terminal device 100 is operating in the Wi-Fi station mode. The terminal device 100 is connected to the AP, operates in the Wi-Fi station mode, and is connected to a network. Also, FIG. 2(*c*) illustrates a state in which the terminal device 100 searches for the external device 100' so as to perform the Wi-Fi P2P communication with the external device 100'.

In accordance with an exemplary embodiment, the terminal device 100 can perform the Wi-Fi P2P communication with the external device while the terminal device 100 is operating in the Wi-Fi station mode after being connected to the AP. At this time, the terminal device 100 can wait for a Wi-Fi P2P communication connection while minimizing the degradation of performance of the Wi-Fi station mode operation.

Hereinafter, an example of an operation of the terminal device 100 in the connection state, as illustrated in FIG. 2(*c*), will be described.

Figure 3:
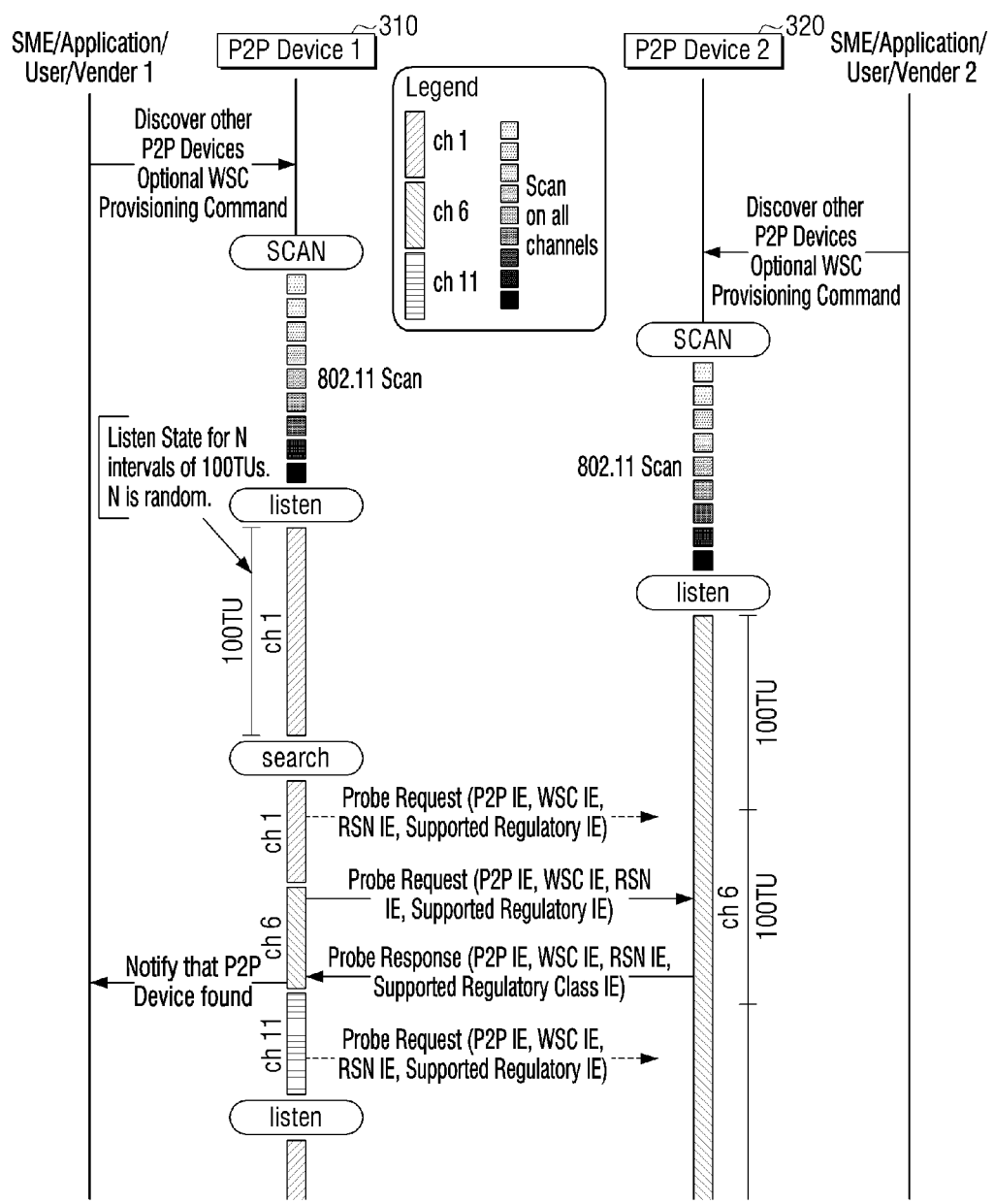
FIG. 3 is a diagram which illustrates a device discovery process between P2P devices according to a Wi-Fi P2P standard.
Figure 4:
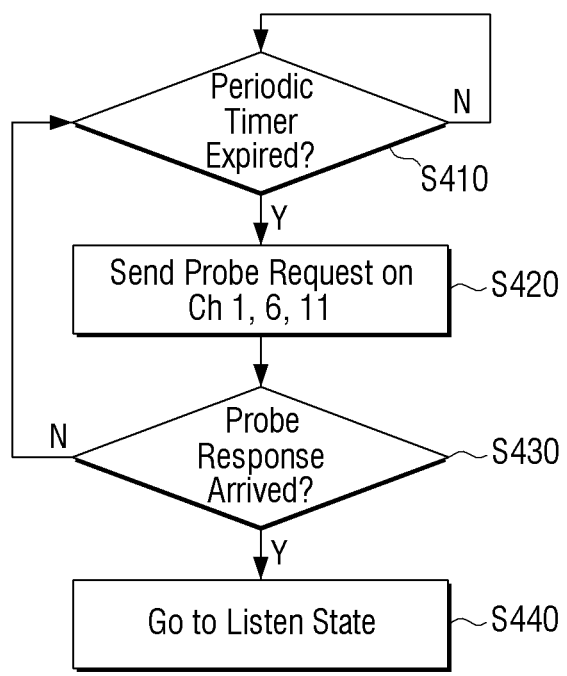
FIG. 4 is a flowchart which illustrates a process in which the terminal device performs a search operation and a listen operation in accordance with an exemplary embodiment of the present invention.
Figure 5:
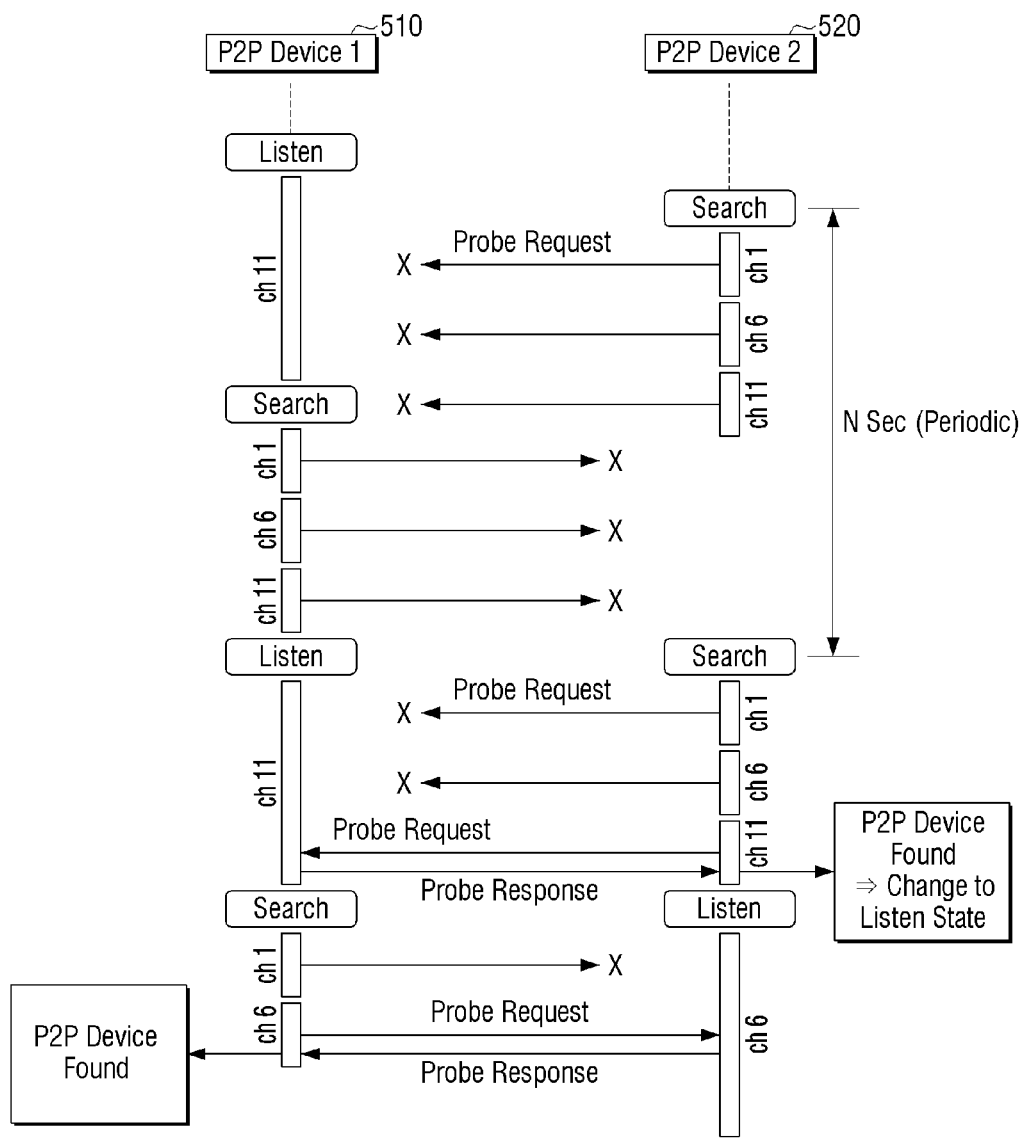
FIG. 5 is a diagram which illustrates a process in which the terminal device searches for an external device according to a method of FIG. 4.

FIGS. 3, 4, and 5 are diagrams which illustrate a process in which the terminal device 100 searches for an external device and the degradation of performance of the station mode in the terminal device 100, according to the process. First, the search process according to a Wi-Fi P2P standard will be described. Thereafter, a difference between a device discovery process according to the industry standard and a device discovery process in accordance with an exemplary embodiment and a difference in performance degradation therebetween will be described with reference to FIGS. 3, 4 and 5.

The device discovery process of the Wi-Fi P2P communication standard is also defined under an assumption of the case of FIG. 2(*b*). In order to perform Wi-Fi P2P communication, the terminal device should perform the device discovery process. The device discovery process is a process in which two P2P devices search for and find each other by exchanging through the same channel device-related information such as device names and device types.

According to the Wi-Fi P2P standard, when the device discovery process is started, a find operation is iterated after a scan operation. In the find operation, a listen operation and a search operation are iterated.

In the scan operation, information regarding devices nearby the P2P devices and network environments are collected by scanning all channels. Thereafter, in the listen operation during the find operation, one channel is selected from among social channels (Ch. 1, 6, and 11) and the transmission of a probe request frame by another device is awaited for a random period of time value between 100 time units (TUs) and N*100 TUs. When the probe request frame transmitted by the other device in the search operation is received, a response is transmitted as a probe response frame. In addition, in the search operation during the find operation, the probe request frame is transmitted on each of the social channels (Ch. 1, 6, and 11) and the reception of the probe response frame is awaited.

When the P2P devices reach a common channel while iterating the find operation, the P2P devices find each other by exchanging device-related information such as device names and types through the probe request frame and the probe response frame.

After the above-described device discovery process is completed, the process proceeds to the step of group formation which determines a role of a P2P GO or a P2P client between the mutually found devices, for a Wi-Fi P2P connection.

FIG. 3 is a diagram illustrating the device discovery process between P2P devices according to the above-described Wi-Fi P2P standard.

According to FIG. 3, while a P2P device 1 (310) and a P2P device 2 (320) iterate the find operation (the listen operation and the search operation), the P2P device 1 (310) transmits the probe request frame through Ch. 6 when the P2P device 2 (320) performs the listen operation through Ch. 6. The P2P device 2 (320) receiving the probe request frame transmits the probe response frame and hence the P2P device 1 (310) finds the P2P device 2 (320).

On the other hand, when the terminal device 100 is intended to perform the Wi-Fi P2P communication with the external device 100' while the terminal device 100 is operating in the Wi-Fi station mode after being connected to an AP as illustrated in FIG. 2(*c*), the controller 110 of the terminal device should control the Wi-Fi module 120 to operate while switching between the Wi-Fi station mode and the Wi-Fi P2P mode in which the above-described device discovery operation is performed. Accordingly, the performance of the Wi-Fi station mode operation may be degraded during the device discovery operation. Particulars relating to the case of FIG. 2(*c*) are not handled in a Wi-Fi P2P communication standard document and differ according to the vender.

Hereinafter, the performance degradation of the Wi-Fi station mode when the terminal device operates while switching between the Wi-Fi station mode and the Wi-Fi P2P mode in which the device discovery operation of the above-described standard is performed will be specifically described with reference to the example of FIG. 3.

In the example of FIG. 3, assuming that the P2P device 1 (310) refers to a terminal device that is operating in the station mode after being connected to the AP, and the P2P device 2 (320) refers to an external device for which the P2P device 1 (310) is searching for the Wi-Fi P2P communication, the operation is as follows.

When the P2P device 1 (310) is operating while switching between the Wi-Fi station mode and the Wi-Fi P2P mode in which the device discovery operation is performed so as to perform the Wi-Fi P2P communication with the external device (i.e., the P2P device 2 (320)) while the P2P device 1 (310) is operating in the Wi-Fi station mode, the P2P device 1 (310) iterates the find operation according to the above-described standard until the external device (the P2P device 2 (320)) is found while the P2P device 1 (310) is switched to the Wi-Fi P2P mode and operated.

At this time, it is necessary for the P2P device 1 to make a change from a channel for use in the station mode to the social channels (Ch. 1, 6, and 11) while the device discovery operation is performed. Accordingly, when the channel used in the station mode is not the social channel, the performance degradation of the station mode operation for a channel change time is inevitable. In particular, when a channel for use in a connection to the AP in the station mode is different from a channel of the listen operation of the find operation of the device discovery process, the performance may be further degraded.

Accordingly, a method of performing the device discovery process for the Wi-Fi P2P communication while minimizing the degradation of performance is necessary. Because a process after the terminal device operating in the Wi-Fi station mode has established the Wi-Fi P2P connection to the external device is not directly related to the exemplary embodiments, description thereof is omitted herein.

FIG. 4 is a flowchart which illustrates a process in which the terminal device performs the search operation and the listen operation in accordance with an exemplary embodiment.

According to FIG. 4, when the Wi-Fi P2P function is executed, the controller 110 of the terminal device 100 controls the Wi-Fi module 120 to perform a search operation (S420) of transmitting a probe request frame while sequentially selecting the social channels (Ch. 1, 6, and 11) after a preset time (Yes in S410) and waiting for a probe response frame from the external device, and to perform a listen operation (S440) of receiving a probe request frame from the external device and transmitting a probe response frame when the probe response frame is received from the external device and the presence of the external device is searched for (Yes in S430). In response to no probe response being received from the external device during the search operation (No in S430), a process of performing the search operation after the preset time is iterated.

FIG. 5 is a diagram which illustrates a device discovery process in which the terminal device 100 and the external device find each other so as to enable the terminal device 100 to perform P2P communication while the terminal device 100 is operating in the Wi-Fi station mode in accordance with an exemplary embodiment.

In FIG. 5, a P2P device 1 (510) is an external device using a device discovery scheme of the above-described Wi-Fi P2P standard for the Wi-Fi P2P communication, and a P2P device 2 (520) is a terminal device that performs the search operation and the listen operation using the method illustrated in FIG. 4 in accordance with the exemplary embodiment for the Wi-Fi P2P communication when a Wi-Fi P2P function is executed while the terminal device is operating in the Wi-Fi station mode after being connected to an AP.

According to FIG. 5, the P2P device 2 (520) iterates a search operation of periodically transmitting a probe request frame using the social channels (Ch. 1, 6, and 11) and waiting for a probe response frame. The P2P device 1 (510) selects Ch. 11 as a listen channel, receives the probe request frame from the P2P device 2 (520) in a second listen operation, and transmits the probe response frame for the probe request frame. The P2P device 2 (520) receives the probe response frame from the P2P device 1 (510) and recognizes the presence of the P2P device 1 (510) that is performing the device discovery process for the Wi-Fi P2P communication. At this time, the P2P device 2 (520) starts the listen operation instead of the search operation. Thereafter, when the P2P device 1 (510) performs the search operation, the probe request frame is delivered to the P2P device 2 (520) that is performing the listen operation. When the P2P device 2 (520) transmits the probe response frame, the P2P device 1 (510) completes a process of searching for the P2P device 2 (520). Thus, the discovery process between the P2P devices is completed.

On the other hand, compared to the case of FIG. 3, the above-described device discovery process of FIG. 5 is different in that the terminal device 520 performs only the search operation without the listen operation before the probe response frame is received from the external device when switching between the Wi-Fi station mode and the Wi-Fi P2P mode and performing the device discovery operation and performs the listen operation only when receiving the probe response frame from the external device.

Accordingly, because no listen operation is performed until the probe response frame is received from the external device, the duration of the Wi-Fi P2P mode is reduced by a time of the listen operation (a time having a random value between 100 TUs and N*100 TUs according to the Wi-Fi P2P standard) until the external device is found, and resumption of a connection for the Wi-Fi station mode is fast, and hence the degradation of performance is reduced.

That is, because no listen operation is performed until the external device is found through the search operation in the device discovery process when the terminal device 520 is intended to wait for a Wi-Fi P2P connection to the external device while operating in the Wi-Fi station mode, the terminal device 520 can wait for the Wi-Fi P2P connection to the external device while minimizing the performance degradation of the station mode.

Consequently, in accordance with an exemplary embodiment in the case of FIG. 2(c), when the Wi-Fi P2P function is executed and the Wi-Fi module 120, which is operating in the Wi-Fi station mode after being connected to the AP, performs the device discovery process for the P2P communication simultaneously with the Wi-Fi station mode, the controller 110 of the terminal device 100 can control the Wi-Fi module 120 to iterate an operation of resuming the connection to the AP until the external device 100' to perform the Wi-Fi P2P communication is searched for after performing the search operation through each channel while interrupting the connection to the AP and sequentially selecting the social channels. In addition, when the external device 100' is searched for during the search operation, the controller 110 of the terminal device 100 can control the Wi-Fi module to perform the listen operation for receiving a signal transmitted from the external device.

Through this, the terminal device can wait for the Wi-Fi P2P connection while minimizing the performance degradation of the Wi-Fi station mode operation when the Wi-Fi station mode and the Wi-Fi P2P mode of the device discovery process operate while channel switching is performed.

For example, when a degree of performance degradation is quantitatively calculated, a time of about 30 ms is taken to transmit and receive a probe request signal on each social channel. Accordingly, because a time of about 90 ms is taken for the search operation using the three social channels (Ch. 1, 6, and 11), the Wi-Fi P2P connection can be awaited with a loss of about 9% when the Wi-Fi station mode and the Wi-Fi P2P mode are switched every second, and with a loss of about 4.5% when the Wi-Fi station mode and the Wi-Fi P2P mode are switched every two seconds.

Figure 6:
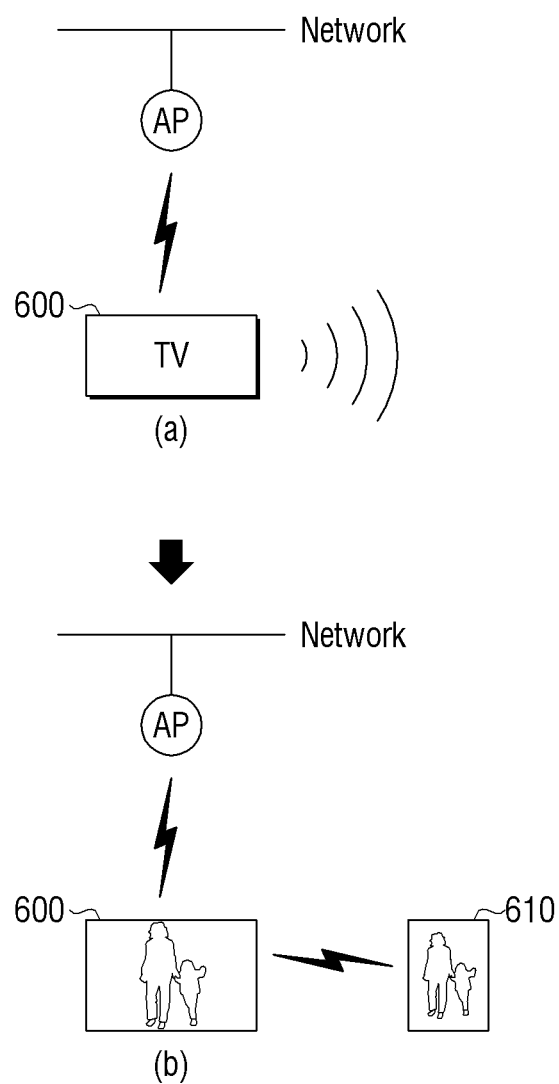
FIG. 6 is a diagram which illustrates an example of Wi-Fi P2P communication with a portable phone when the terminal device is mounted on a TV in accordance with an exemplary embodiment.

FIG. 6 is a diagram which illustrates an example in which Wi-Fi P2P communication is performed between the terminal device and the external device.

The terminal device 100 in accordance with an exemplary embodiment may be mounted on any devices capable of Wi-Fi wireless communication such as portable devices such as a TV, a notebook, a printer, and a camera, and a mobile terminal. FIG. 6 illustrates the case in which the terminal device is mounted on a TV 600. A Wi-Fi module which performs the device discovery process according to the Wi-Fi P2P standard is mounted on a portable phone 610 that is an external device.

FIG. 6(*a*) illustrates a form in which the TV 600 performs the device discovery operation with channel switching using the method described with reference to FIG. 4 for Wi-Fi P2P communication while the TV 600 is operating in the Wi-Fi station mode operation after being connected to an AP. At this time, the TV 600 waits for the Wi-Fi P2P communication connection in a background while minimizing the performance degradation of the station mode by performing only the search operation before an external device is found.

Thereafter, when the TV 600 finds the portable phone 610 in the device discovery process for the Wi-Fi P2P communication in FIG. 6(*b*), the listen operation is performed. When the TV 600 is performing the listen operation, the portable phone 610 also finds the TV 600 in response to the portable phone 610 performing the search operation. Thereafter, through several processes, the TV 600 and the portable phone 610 perform Wi-Fi P2P communication. FIG. 6(*b*) illustrates a form in which a screen of the portable phone is transmitted to the TV.

On the other hand, when the terminal device 100 is turned on and initialized, the controller 110 of the terminal device 100 controls the Wi-Fi module 120 to operate in the Wi-Fi station mode and causes a Wi-Fi P2P function of performing the device discovery process described above, with reference to FIGS. 4 and 5, to be automatically executed.

In addition, in accordance with an exemplary embodiment, the terminal device 100 can further include an input for receiving a user command to execute a Wi-Fi P2P function in addition to the controller 110 and the Wi-Fi module 120. In this case, the controller 110 can enable the Wi-Fi P2P function of performing the device discovery process described above with reference to FIGS. 4 and 5 only when the user command is input through the input.

Figure 7:
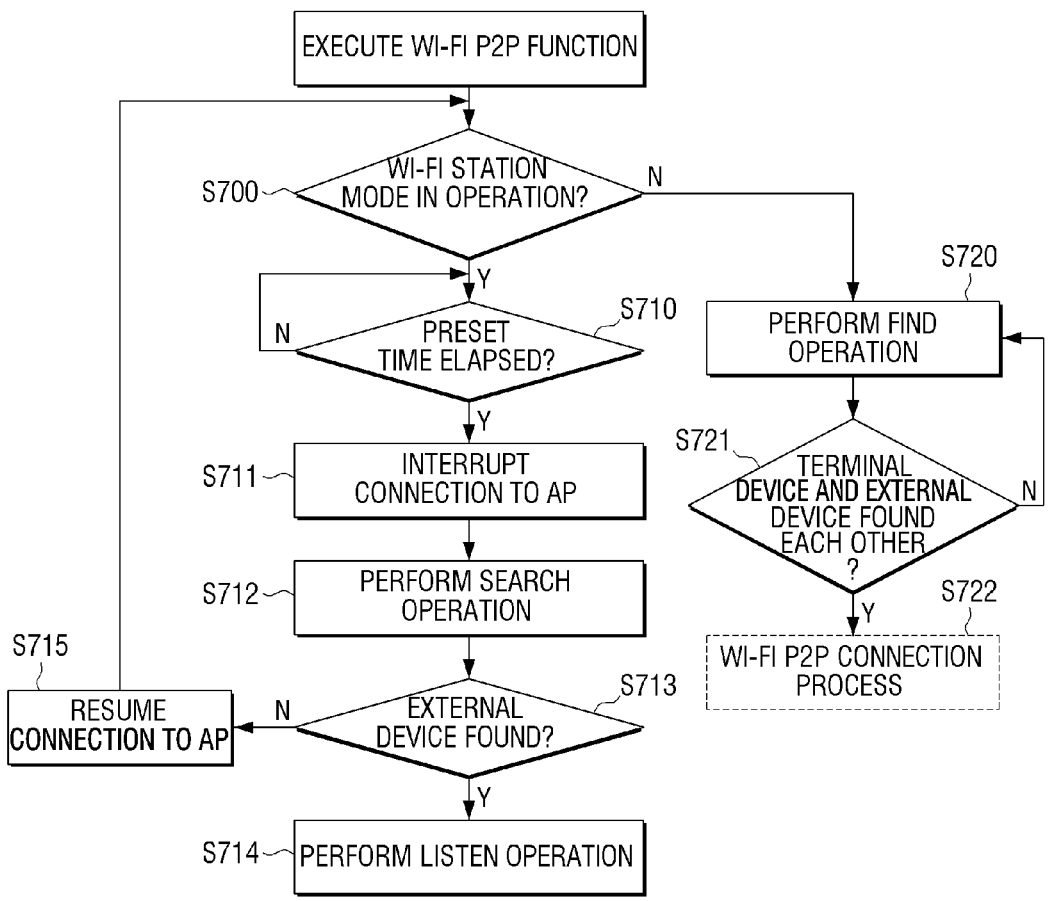
FIG. 7 is a flowchart which illustrates a process of determining whether a Wi-Fi station mode is in operation and controlling a Wi-Fi module according to the determination result in accordance with an exemplary embodiment.

FIG. 7 is a flowchart which illustrates a process of determining whether the Wi-Fi station mode is in operation and controlling the Wi-Fi module according to the determination result in accordance with an exemplary embodiment.

According to FIG. 7, when the Wi-Fi P2P function is executed, the controller 110 of the terminal device 100 determines whether the Wi-Fi station mode is in operation (S700). When it is determined that the Wi-Fi station mode is in operation (Yes in S700), a connection to an AP is interrupted every time a preset time has elapsed (S711). When no external device is found through the search operation (No in S713) after the search operation (S712) has been performed, the connection to the AP is resumed (S715). The Wi-Fi module 120 is controlled to iterate the above-described operation by returning to step S700 of determining whether the Wi-Fi station mode is in operation. In response to an external device being found through the search operation (Yes in S713), the Wi-Fi module 120 is controlled to perform a listen operation (S714) of receiving a signal transmitted from the external device and transmitting a response.

On the other hand, when the Wi-Fi P2P function is executed and the controller 110 of the terminal device 100 determines that the Wi-Fi station mode is not in operation (No in S700) after determining whether the Wi-Fi station mode is in operation (S700), the controller 110 of the terminal device 100 controls the Wi-Fi module 120 to perform a find operation (S720) until the terminal device 100 and the external device find each other (No in S721). In response to the terminal device and the external device finding each other through the find operation (Yes in S721), the controller 110 of the terminal device 100 controls the Wi-Fi module 120 to perform a subsequent Wi-Fi P2P connection process (S722).

On the other hand, when a search process between the terminal device and the external device for the Wi-Fi P2P communication is completed, a process of identifying a communication partner device is completed. Thereafter, the process proceeds to the step of forming a Wi-Fi P2P group.

In the P2P group formation process, a P2P GO between devices is determined. According to the Wi-Fi P2P standard, a device responsible for a function of an AP in an existing infrastructure network within a P2P group is referred to as the P2P GO. There is one GO within one P2P group and all the remaining devices become client devices.

The P2P GO within the P2P group is responsible for a core function of the P2P group. The P2P GO allocates a P2P interface address, selects an operating channel of the group, and transmits a beacon signal including various operation parameters of the group.

On the other hand, a device serving as the P2P GO between the P2P devices is determined by a GO intent value of a P2P attribute identifier (ID). Because this value can be adjusted by an application or higher-order layer service without being fixed in a certain device, a developer can select a value suitable for the P2P GO according to a purpose of use of an application program.

FIG. 8 is a diagram which illustrates a process in which the terminal device adjusts a P2P communication channel to a station mode channel by operating as a GO when the terminal device operates in the Wi-Fi station mode and the P2P mode simultaneously in accordance with an exemplary embodiment.

In FIG. 8(*a*), the terminal device 100 is connected to an AP through Ch. 5 in the Wi-Fi station mode. At this time, when the Wi-Fi P2P function is executed, the controller 110 of the terminal device 100 controls the Wi-Fi module 120 to perform switching among Ch. 5 and the social channels (Ch. 1, 6, and 11) and searches for the external device 100' using the method described above with reference to FIGS. 4 and 5. When the search for the external device 100' is completed, the process proceeds to the group formation step in a P2P connection process. In the group formation step, the GO is determined. At this time, the terminal device 100 can become the P2P GO by setting a GO intent value of the P2P attribute ID of the terminal device 100 to be high.

As a result, according to FIG. 8(*b*), the terminal device 100 becomes the GO within the P2P group including the external device 100' and can perform Wi-Fi P2P communication with the external device 100' by selecting Ch. 5, which is a connection channel for the AP in the Wi-Fi station mode, as the operating channel of the P2P group.

Accordingly, because the same channel can be used in the Wi-Fi station mode and the Wi-Fi P2P mode after the Wi-Fi P2P connection is established between the terminal device 100 and the external device 100', the degradation of performance due to channel switching between the station mode and the P2P mode can be reduced.

FIG. 9 is a flowchart which illustrates a Wi-Fi P2P method of communication of the terminal device in accordance with an exemplary embodiment. According to FIG. 9, when a Wi-Fi P2P function is executed (S910) in a state in which the terminal device operates in the Wi-Fi station mode (S900), a connection to an AP is interrupted (S930) every time a preset time has elapsed (S920). After a search operation is performed through each channel while the social channels (Ch. 1, 6, and 11) are sequentially selected (S940), an operation (S970) of resuming the connection to the AP is iterated when no external device is found in the search operation (No in S950). In response to an external device being found in the search operation (Yes in S950), a listen operation (S960) of receiving a signal transmitted from the external device and transmitting a response is performed.

In addition, the Wi-Fi P2P method of communication can further include the step of automatically executing the Wi-Fi P2P function when a terminal device is turned on and initialized.

In addition, the Wi-Fi P2P method of communication can further include the steps of receiving an input of a user command for executing the Wi-Fi P2P function; and causing the Wi-Fi P2P function to be executed when a user command is input.

On the other hand, the Wi-Fi P2P method of communication can further include the steps of determining whether the Wi-Fi station mode is in operation when the Wi-Fi P2P function is executed; and iterating a find operation when the Wi-Fi P2P function is executed in a state in which the Wi-Fi station mode is not in operation.

In addition, the Wi-Fi P2P method of communication can further include the steps of establishing a Wi-Fi P2P connection to the external device in response to the external device searching for the terminal device when the external device is found in the search operation while the Wi-Fi P2P function is operating and the listen operation is executed; and adjusting a connection channel for the external device to a connection channel for the AP when the Wi-Fi P2P connection is established.

As described above, according to various exemplary embodiments, when a terminal device, which is operating in the Wi-Fi station mode, waits for a Wi-Fi P2P connection so as to perform Wi-Fi P2P communication with an external device simultaneously with the Wi-Fi station mode operation, the terminal device can wait for the Wi-Fi P2P connection to the external device while minimizing the performance degradation of the Wi-Fi station mode.

According to the above-described various exemplary embodiments, an operation of the controller of the terminal device when a Wi-Fi P2P function is executed during a Wi-Fi station mode operation or a Wi-Fi P2P method of communication of the terminal device can be generated by software and implemented on the terminal device.

Specifically, according to an exemplary embodiment, a non-transitory computer readable medium storing a program for performing the steps of: interrupting a connection to an AP when a Wi-Fi P2P function is executed in a state in which the connection to the AP is established and an operation is performed in a Wi-Fi station mode and iterating an operation of resuming the connection to the AP after a search operation is performed through each channel while a plurality of channels are sequentially selected; and performing a listen operation of receiving a signal transmitted from the external device and transmitting a response when an external device to perform Wi-Fi P2P communication is found in the search operation can be installed.

The non-transitory computer-readable medium refers to a device readable medium that semi-permanently stores data rather than a medium that temporarily stores data such as a register or a cache. Specifically, the above-described various middleware or programs stored in a non-transitory computer readable medium such as a compact disc (CD), a digital versatile disc (DVD), a hard disk, a Blu-ray disc, a universal serial bus (USB), a memory card, or a read only memory (ROM) can be provided.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A terminal device comprising:
   a wireless fidelity (Wi-Fi) module; and
   a controller which, in response to a command for executing a Wi-Fi peer-to-peer (P2P) function being received, determines whether the Wi-Fi module is connected to an access point (AP), and in response to the Wi-Fi module not being connected to the AP, controls the Wi-Fi module to perform a scan operation, iterate a search operation to establish a Wi-Fi P2P connection with an external device, and in response to the Wi-Fi module being connected to the AP, interrupt the connection to the AP when the Wi-Fi P2P function is executed, and iterate an operation of resuming the connection to the AP after a search operation is performed through each channel while a plurality of channels are sequentially selected,
   wherein, when an external device which performs P2P communication is found in the search operation, the controller controls the Wi-Fi module to perform a listen operation of receiving a signal transmitted from the external device and transmitting a response, and
   wherein the controller controls the Wi-Fi module to perform only the search operation without the listen operation before P2P communication is found in the search operation.

2. The terminal device as claimed in claim 1, wherein the controller controls the Wi-Fi module to operate in the Wi-Fi station mode and automatically executes the Wi-Fi P2P function when the terminal device is turned on and initialized.

3. The terminal device as claimed in claim 1, further comprising:
   an input which receives an input of a user command for executing the Wi-Fi P2P function,
   wherein the controller causes the Wi-Fi P2P function to be executed when the user command is input.

4. The terminal device as claimed in claim 1,
   wherein the controller determines whether the Wi-Fi station mode is in operation when the Wi-Fi P2P function is executed,
   wherein the controller iterates the interruption, the search operation, and the connection resumption operation when the Wi-Fi station mode is in operation, and
   wherein the controller iterates a find operation when the Wi-Fi station mode is not in operation.

5. The terminal device as claimed in claim 1, wherein the controller controls the Wi-Fi module to establish a Wi-Fi P2P connection with the external device when the external device finds the terminal device in the listen operation, and adjust a connection channel for the external device to a connection channel for the AP when the Wi-Fi P2P connection to the external device is established.

6. A wireless fidelity (Wi-Fi) peer-to-peer (P2P) method of communication for a terminal device, the method comprising:
   receiving a command for executing a Wi-Fi P2P function;
   in response to receiving the command, determining whether the Wi-Fi module is connected to an access point (AP), and in response to the Wi-Fi module not being connected to the AP, controlling the Wi-Fi module to perform a scan operation, iterating a search operation to establish a Wi-Fi P2P connection with an external device, and in response to the Wi-Fi module being connected to the AP, interrupting a connection to AP when the Wi-Fi P2P function is executed, and iterating an operation of resuming the connection to the AP after a search operation is performed through each channel while a plurality of channels are sequentially selected;

performing only the search operation without a listen operation before P2P communication is found in the search operation; and performing the listen operation of receiving a signal transmitted from the external device when an external device to perform Wi-Fi P2P communication is found in the search operation and transmitting a response.

7. The Wi-Fi P2P communication method as claimed in claim 6, further comprising:
  causing the Wi-Fi module to automatically execute the Wi-Fi P2P function when the terminal device is turned on and initialized.

8. The Wi-Fi P2P communication method as claimed in claim 6, further comprising:
  receiving an input of a user command for executing the Wi-Fi P2P function; and
  causing the Wi-Fi P2P function to be executed in response to the user command being input.

9. The Wi-Fi P2P communication method as claimed in claim 6, further comprising:
  determining whether the Wi-Fi station mode is in operation when the Wi-Fi P2P function is executed; and
  iterating a find operation when the Wi-Fi station mode is not in operation.

10. The Wi-Fi P2P communication method as claimed in claim 6, further comprising:
  establishing a Wi-Fi P2P connection to the external device when the external device finds the terminal device in the listen operation; and
  adjusting a connection channel for the external device to a connection channel for the AP when the Wi-Fi P2P connection to the external device is established.

11. A terminal device comprising:
  a wireless fidelity (Wi-Fi) module; and
  a controller which, in response to a command for executing a Wi-Fi peer-to-peer (P2P) function being received, determines whether the Wi-Fi module is connected to an access point (AP), and in response to the Wi-Fi module not being connected to the AP, controls the Wi-Fi module to perform a scan operation, iterate a search operation to establish a Wi-Fi P2P connection with an external device, and in response to the Wi-Fi module being connected to the AP, interrupts the connection to the AP when the Wi-Fi P2P function is executed and controls the Wi-Fi module to perform a listen operation of receiving a signal transmitted from an external device which performs P2P communication,
  wherein the controller controls the Wi-Fi module to perform only the search operation without the listen operation before P2P communication is found in the search operation.

12. The terminal device as claimed in claim 11, wherein the controller controls the Wi-Fi module to operate in the Wi-Fi station mode and automatically executes the Wi-Fi P2P function when the terminal device is turned on and initialized.

13. The terminal device as claimed in claim 11, further comprising:
  an input which receives an input user command for executing the Wi-Fi P2P function,
  wherein the controller causes the Wi-Fi P2P function to be executed when the user command is input.

14. The terminal device as claimed in claim 11, wherein the controller controls the Wi-Fi module and iterates an operation of resuming the connection to the AP after a search operation is performed through each channel while a plurality of channels are sequentially selected.

15. A Wi-Fi P2P method of communication for a terminal device, the method comprising:
  in response to a command for executing a Wi-Fi peer-to-peer (P2P) function being received, determining whether the Wi-Fi module is connected to an access point (AP);
  in response to the Wi-Fi module not being connected to the AP, controlling the Wi-Fi module to perform a scan operation, iterating a search operation to establish a Wi-Fi P2P connection with an external device;
  in response to the Wi-Fi module being connected to the AP, interrupting a connection to the AP when the Wi-Fi P2P function is executed in a Wi-Fi station mode;
  performing only a search operation without a listen operation before P2P communication is found in the search operation; and
  performing the listen operation of receiving a signal transmitted from an external device when an external device to perform Wi-Fi P2P communication is found in the search operation.

16. The Wi-Fi P2P method of communication for a terminal device of claim 15, further comprising:
  iterating an operation of resuming the connection to the AP after a search operation is performed through each channel while a plurality of channels are sequentially selected.

* * * * *